US009167004B2

(12) United States Patent
Pappu et al.

(10) Patent No.: US 9,167,004 B2
(45) Date of Patent: Oct. 20, 2015

(54) METHODS AND SYSTEMS FOR DETECTING AND MITIGATING A HIGH-RATE DISTRIBUTED DENIAL OF SERVICE (DDOS) ATTACK

(75) Inventors: Surya Pappu, Milpitas, CA (US); Sanjay Oza, Cupertino, CA (US)

(73) Assignee: Sable Networks, Inc., Santa Clara, CA (US)

(*) Notice: Subject to any disclaimer, the term of this patent is extended or adjusted under 35 U.S.C. 154(b) by 208 days.

(21) Appl. No.: 13/398,597

(22) Filed: Feb. 16, 2012

(65) Prior Publication Data

US 2012/0216282 A1    Aug. 23, 2012

Related U.S. Application Data

(60) Provisional application No. 61/444,083, filed on Feb. 17, 2011.

(51) Int. Cl.
*G06F 11/00* (2006.01)
*G06F 12/14* (2006.01)
*G06F 12/16* (2006.01)
(Continued)

(52) U.S. Cl.
CPC .......... *H04L 63/1458* (2013.01); *H04L 43/026* (2013.01); *H04L 47/2441* (2013.01); *H04L 47/2483* (2013.01); *H04L 47/41* (2013.01); *H04L 47/80* (2013.01);
(Continued)

(58) Field of Classification Search
CPC . H01L 12/2602; H01L 43/00; H01L 63/1408; H01L 63/1425; H01L 63/1458; H01L 43/026; H01L 69/22; H01L 12/2613; H01L 45/38; H01L 47/2441; H01L 47/2483; H01L 47/41; H01L 47/80
USPC ................................................ 726/22–25, 13
See application file for complete search history.

(56) References Cited

U.S. PATENT DOCUMENTS 5,014,265 A   5/1991   Hahne et al.
5,067,127 A   11/1991  Ochiai
(Continued)

FOREIGN PATENT DOCUMENTS

EP    2112800 A1    10/2009

OTHER PUBLICATIONS

Awduche, D.O., et al., "Requirements for Traffic Eng. Over MPLS," [Online] Available: Internet Eng. Task Force, http://www.ietf.org/rfc/rfc2702, pp. 1-28, Sep. 1999 [Accessed May 13, 20013].
(Continued)

*Primary Examiner* — Evans Desrosiers
*Assistant Examiner* — Forrest Carey
(74) *Attorney, Agent, or Firm* — Perkins Coie LLP

(57) ABSTRACT

Methods and systems for detecting and mitigating high-rate Distributed Denial of Service (DDoS) attacks are herein described. The present invention contemplates a variety of improved techniques for using a flow-based statistical collection mechanism to monitor and detect deviations in server usage data. The method further includes combining multiple anomaly algorithms in a unique way to improve the accuracy of identifying a high-rate DDoS attack. The DDoS solution includes a two-phase approach of detection and mitigation, both of which operate on a local- and a global-basis. Moreover, the anomaly algorithms can be modified or extrapolated to obtain the traffic deviation parameters and therefore, the attack probabilities.

17 Claims, 8 Drawing Sheets

(51) Int. Cl.
*G08B 23/00* (2006.01)
*H04L 29/06* (2006.01)
*H04L 12/26* (2006.01)
*H04L 12/851* (2013.01)
*H04L 12/891* (2013.01)
*H04L 12/927* (2013.01)
*G06F 9/00* (2006.01)
*G06F 15/16* (2006.01)
*G06F 17/00* (2006.01)

(52) U.S. Cl.
CPC ....... *H04L 63/1408* (2013.01); *H04L 63/1416* (2013.01); *H04L 63/1425* (2013.01); *H04L 69/22* (2013.01)

(56) References Cited

U.S. PATENT DOCUMENTS

| | | | |
|---|---|---|---|
| 5,267,232 | A | 11/1993 | Katsube et al. |
| 5,436,886 | A | 7/1995 | McGill |
| 5,467,343 | A | 11/1995 | Lee et al. |
| 5,559,611 | A | 9/1996 | Bloomfield et al. |
| 5,701,291 | A | 12/1997 | Roberts |
| 5,909,440 | A | 6/1999 | Ferguson et al. |
| 5,917,821 | A | 6/1999 | Gobuyan et al. |
| 5,933,425 | A | 8/1999 | Iwata |
| 5,995,503 | A | 11/1999 | Crawley et al. |
| 6,006,264 | A | 12/1999 | Colby et al. |
| 6,072,797 | A | 6/2000 | Fletcher |
| 6,081,522 | A | 6/2000 | Hendel et al. |
| 6,081,524 | A | 6/2000 | Chase et al. |
| 6,195,697 | B1 | 2/2001 | Bowman-Amuah |
| 6,249,519 | B1 | 6/2001 | Rangachar |
| 6,473,400 | B1 | 10/2002 | Manning |
| 6,487,170 | B1 | 11/2002 | Chen et al. |
| 6,574,195 | B2 | 6/2003 | Roberts |
| 6,801,502 | B1 | 10/2004 | Rexford et al. |
| 7,020,082 | B2 | 3/2006 | Bhagavath et al. |
| 7,126,918 | B2 | 10/2006 | Roberts |
| 7,467,225 | B2 | 12/2008 | Anerousis et al. |
| 7,813,356 | B2 | 10/2010 | Roberts |
| 7,854,003 | B1 | 12/2010 | Strayer et al. |
| 8,280,968 | B1* | 10/2012 | Duan ........................... 709/206 |
| 2002/0032793 | A1 | 3/2002 | Malan et al. |
| 2004/0250124 | A1 | 12/2004 | Chesla et al. |
| 2005/0125195 | A1* | 6/2005 | Brendel ........................ 702/182 |
| 2006/0133280 | A1* | 6/2006 | Natchu ........................ 370/235 |
| 2006/0206935 | A1 | 9/2006 | Choi et al. |
| 2007/0283436 | A1* | 12/2007 | Duffield et al. ................ 726/23 |
| 2008/0084977 | A1 | 4/2008 | Nayak et al. |
| 2008/0126538 | A1 | 5/2008 | Uyama et al. |
| 2008/0132257 | A1 | 6/2008 | Fok et al. |
| 2008/0250497 | A1 | 10/2008 | Mullarkey et al. |
| 2010/0100962 | A1* | 4/2010 | Boren ........................... 726/25 |
| 2011/0113009 | A1 | 5/2011 | Gupta et al. |
| 2011/0211465 | A1 | 9/2011 | Farrugia et al. |
| 2011/0264961 | A1 | 10/2011 | Hong et al. |
| 2011/0320607 | A1 | 12/2011 | Harrang et al. |

OTHER PUBLICATIONS

Blake, S., et al., "An Architecture for Differentiated Services," [Online] Available: Internet Eng. Task Force, http://www.ietf.org/rfc/rfc2475, pp. 1-34, Dec. 1998 [Accessed: May 13, 2013].

Braden, R., et al., "Resource ReSerVation Protocol (RSVP)," [Online] Internet Eng. Task Force, http://www.ietf.org/rfc/rfc2005, pp. 1-105, Sep. 1997 [Accessed May 13, 2013].

Delgadillo, K., "NetFlow Services and Application," white paper, Cisco Systems, Inc., pp. 1-27, 1996.

"Flow Collector Overview," Cisco CNS NetFlow Collection Engine Installation and Configuration Guide, 3.0 [Online] Available: http://www.cisco.com/en/US/docs/net_mgmt/netflow_collection_engine/3.0/user/guide/nfcover.html#wp5695, pp. 1-8, 1992 [Accessed: May 13, 2013].

"The Need for QoS," white paper, Startdust.com, Inc., pp. 1-14, Jul. 1999.

"NetFlow Services and Applications," white paper, Cisco Systems, Inc., Internet Archive, Way Back Machine, [Online] http://web.archive.org/web/20010210030618/http://www.cisco.com/warp/public/cc/pd/ios, pp. 1-21 [Accessed: May 22, 2013].

Nichols, K., et al., "Definition of the Differentiated Services Field (DS Field) in the IPv4and IPv6 Headers," Internet Eng. Task Force, http://www.ietf.org/rfc/rfc2474.pp. 1-19 Dec. 1998 [Accessed May 13, 2013].

"QoS Protocols & Architectures", white paper, Stardust.com, Inc., Jul. 8, 1999, pp. 1-25.

Shenker, S., et al., "Specification of Guaranteed Quality of Service," Internet Eng. Task Force, http://www.ietf.org/rfc/rfc2212, pp. 1-19, Sep. 1997 [Accessed May 13, 2013].

"Tag Switching, Cisco IOS Technologies," http://www.cisco.com/warp/public/cc/cisco/mkt/ios/tag/index.shtml, Cisco Systems, Inc., Internet Archive, Way Back Machine, pp. 1-4 [Accessed May 22, 2013].

International Search Report and Written Opinion mailed Aug. 8, 2013, in International Patent Application No. PCT/US2012/025632 filed Feb. 16, 2013.

International Search Report and Written Opinion mailed Aug. 12, 2013, in International Patent Application No. PCT/US2012/040807 filed May 13, 2013.

Co-Pending U.S. Appl. No. 13/893,210 by Pappu, S., filed May 13, 2013.

Extended European Search Report mailed May 6, 2015, for European Patent Application No. 12865509.9, filed Feb. 16, 2012.

Supplementary European Search Report mailed May 20, 2015, for European Patent Application No. 13790644.2.

* cited by examiner

METHODS AND SYSTEMS FOR DETECTING AND MITIGATING A HIGH-RATE DISTRIBUTED DENIAL OF SERVICE (DDOS) ATTACK

CROSS REFERENCES

This application claims the benefit of U.S. Provisional Application No. 61/444,083, entitled "METHODS AND SYSTEMS FOR DETECTING AND MITIGATING A DISTRIBUTED DENIAL OF SERVICE ATTACK," filed Feb. 17, 2011, which is hereby incorporated by reference.

This patent application is related to the technologies described in the following patents, all of which are herein incorporated by reference:

U.S. Pat. No. 6,574,195 (application Ser. No. 09/552,278), entitled "MICRO-FLOW MANAGEMENT" filed Apr. 19, 2000; and U.S. Pat. No. 7,126,918 (application Ser. No. 10/086,763), entitled "MICRO-FLOW MANAGEMENT" filed Feb. 27, 2002; and U.S. Pat. No. 7,813,356 (application Ser. No. 11/533,346), entitled "MICRO-FLOW MANAGEMENT" filed Sep. 19, 2006.

BACKGROUND

A Distributed Denial of Service (DDoS) attack can compromise and debilitate the bandwidth and resources not only of the targeted system, but of entire networks. Legacy routers and traditional surveillance and monitoring techniques have major limitations in defending against DDoS attacks on their own—both in terms of the attack detection accuracy and in scaling performance (i.e., to be able to perform detection and potentially mitigate attack traffic while still allowing legitimate users access to the server, at high speeds of the order of tens of gigabits per second).

From the point of view of detecting traffic anomalies, all types of attacks can be broadly grouped into two categories: "high-rate" and "low-rate." A low-rate attack is typically geared towards TCP applications wherein bursts of attacks are sent over a short period of time to exploit TCP's inherent exponential back-off mechanism. Low-rate attacks often involve short bursts of attack traffic followed by a lull of no traffic, with this pattern repeating over and over. In contrast, high-rate attacks are typified as a constant flood of activity from multiple connections that involves a sudden surge in the packet, byte, or flow count towards the victim server. A variety of protocols are prone to high-rate attacks (e.g., ICMP ping flood, UDP flood, TCP SYN attack) such that a system for detecting and mitigating a high-rate DDoS attack must address a wide range of flood-attacks.

Anti-DDoS systems and security appliances (Intrusion Detection/Intrusion Prevention systems) target the detection of specific DDoS attacks and hence require CPU-intensive operations. The tremendous amount of state information needed to detect every type of attack greatly limits system performance and precludes having a scalable solution (i.e., a solution that can scale to the order of tens of gigabits per second). Several reported instances of devices crashing during a DDoS attack in the recent past demonstrate the ease with which security appliances/anti-DDoS systems can be overwhelmed, thereby defeating the purpose of having such a device in the network. The rapid response necessary to detect and mitigate DDoS attacks can degrade data path and CPU performance in the current model of security devices.

Legacy routers and Layer 3 devices that support DDoS attack detection, use a range of traffic anomaly algorithms that are primarily based on sampling packets from the data path. Such an approach can be fairly inaccurate (as it is plagued with a high false positive or false negative rate) and it can result in degraded data path or CPU performance, depending on the sampling frequency used. During a high-rate attack, a majority of the flows (e.g., identified using five tuple) may have very few (as low as just a couple) packets in them (see related patents under "Cross-references" for more details on "flows"). The typical packet sampling techniques will fail to detect such attacks due to missed samples from the flow, especially if the sampling frequency is too low. A higher sampling frequency with an improved attack detection can be achieved, but will result in degraded data path (or CPU) performance.

Once an attack is successfully detected, standard mitigation tactics are also inadequate in resolving a DDoS attack. Typical mitigation policies involve discarding all packets destined to the victim server without analyzing whether the packets originated from a legitimate user or an attacker. Also, standard approaches do not offer the ability to export real-time data to other apparatuses, nor do they allow an operator to configure a flexible, customized policy.

As such, a new, scalable, and robust DDoS Detection and Mitigation approach with inherent intelligence, which addresses all the shortcomings discussed above, is needed. Such an approach maintains accurate state information to check for anomalous traffic patterns (to detect a variety of high rate DDoS attacks), can distinguish between an attacker and a legitimate user when an attack is detected, allows an operator to configure a flexible mitigation policy (that may include exporting real time flow data to other apparatuses for further analysis), and can operate without degrading the overall system performance (forwarding data path or control plane CPU).

BRIEF DESCRIPTION OF THE DRAWINGS

Examples of a method, system, and apparatus for detecting and mitigating a high-rate Distributed Denial of Service (DDoS) attack are illustrated in the figures. The examples and figures are illustrative rather than limiting.

DETAILED DESCRIPTION

The following description and drawings are illustrative and are not to be construed as limiting. Numerous specific details are described to provide a thorough understanding of the disclosure. However, in certain instances, well-known or conventional details are not described in order to avoid obscuring the description.

Without intent to further limit the scope of the disclosure, examples of instruments, apparatus, methods and their related results according to the embodiments of the present disclosure are given below. Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

The terminology used in the description presented below is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this Detailed Description section.

Figure 1:
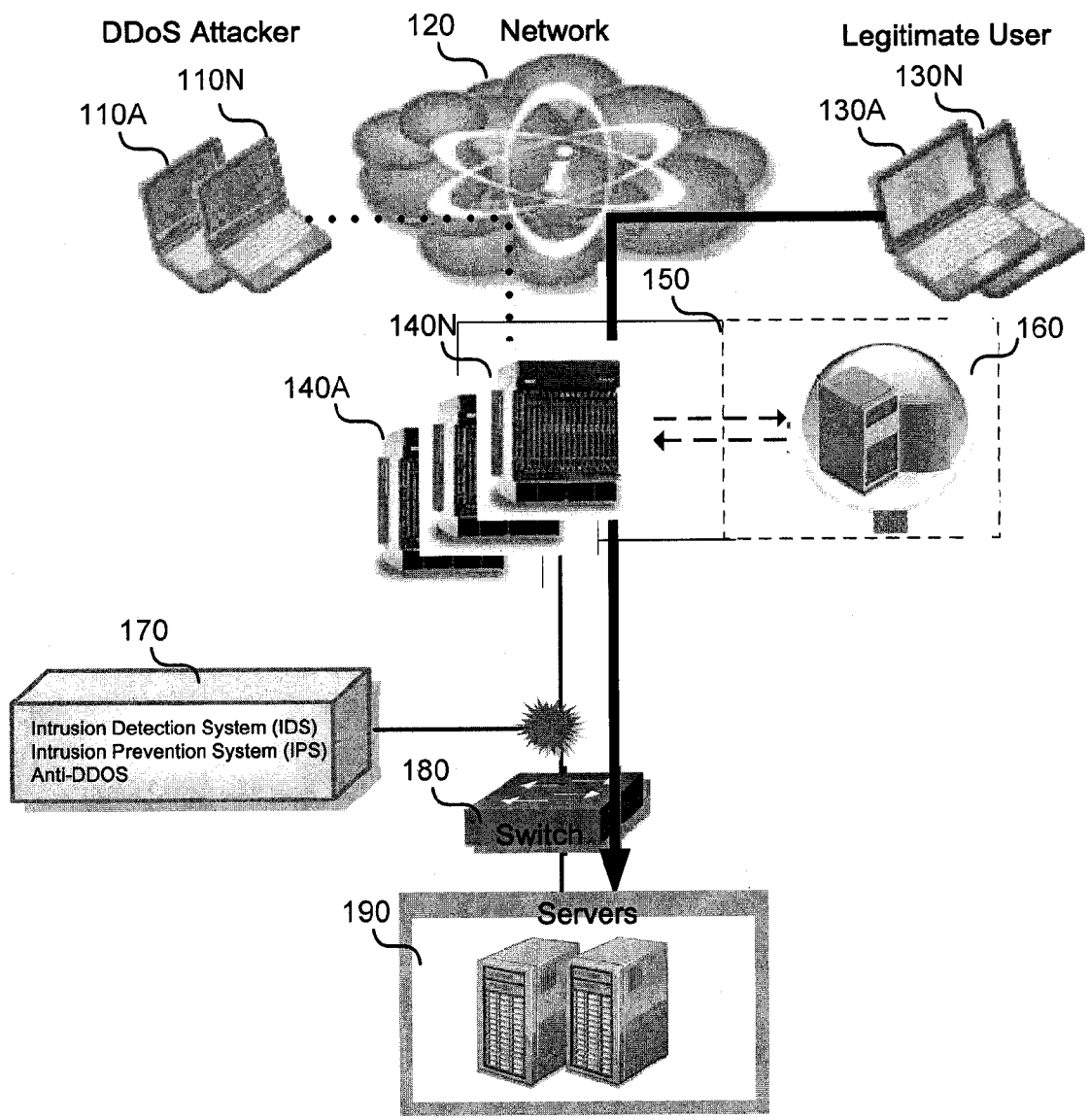
FIG. 1 depicts an example environment in which the method and system for detecting and mitigating high-rate DDoS attacks can be implemented.

FIG. 1 and the following discussion provide a brief, general description of a representative environment in which the method and system for detecting and mitigating high-rate DDoS attacks (generally termed a "DDoS solution") can be implemented, according to one embodiment. Use of the term "system" herein may refer to some or all of the elements of FIG. 1, or other aspects of the DDoS solution).

FIG. 1 depicts an example environment 100 comprising one or more DDoS attackers 110A-N and one or more legitimate users 130A-N coupled via a network (e.g., Internet) 120, a DDoS solution 150 having one or more local-tier mechanisms 140A-N and an additional global-tier mechanism 160, one or more security appliance 170 [e.g., Intrusion Prevention System (IPS), Intrusion Detection System (IDS), Anti-DDoS System], a switch 180, and plurality of servers 190. While an embodiment of the local-tier mechanism 140 is shown as a router in FIG. 1, the local-tier mechanism may be implemented in other systems as well (e.g., security appliance, legacy routers).

The network 120 may include, but is not limited to, a telephonic network or an open network, such as the Internet. The network 120 may be any collection of distinct networks operating wholly or partially in conjunction to provide connectivity to the electronic devices and may appear as one or more networks to the serviced systems and devices. In one embodiment, communications over the network 120 may be achieved by a secure communications protocol, such as secure sockets layer (SSL), or transport layer security (TLS).

In addition, communications can be achieved via one or more wireless networks, such as, but is not limited to, one or more of a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G networks, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The example environment shown in FIG. 1 illustrates an example DDoS solution 150 whereby the plurality of servers 190 are monitored for attacks. The DDoS solution 150 can be implemented via a two-tier approach, whereby each tier includes a detection phase and a mitigation phase. The first tier 140 of this embodiment comprises of the local detection and local mitigation phases. In other words, the local-tier is based on a local view of traffic to the servers on an individual basis. The second tier 160 of this embodiment also performs detection and mitigation functions, but performed on a more holistic (e.g., global) basis that accounts for system and network level requirements. That is, the global tier is based on aggregating data from multiple local tiers to give a more comprehensive view of traffic to a server. The detection phase of the second tier includes periodically receiving data from one or more local tier entities. The mitigation phase of the global tier includes applying a more comprehensive policy that can address a particular anomaly as it allows unaffected activity to resume.

In one embodiment, the DDoS solution 150 solely comprises of one or more local mechanisms 140A-N performing local detection and mitigation of a high-rate DDoS attack. The detection phase of a local-tier mechanism 140 identifies a high-rate DDoS attack by proactively looking for anomalous traffic patterns localized to the server(s) 190. The mitigation phase of the local-tier mechanism 140 includes controlling a high-rate DDoS attack to particular server(s) by, dynamically applying a policy suited for the type of attack (such as enforcing a punitive action on traffic coming from the attackers).

As shown in FIG. 1, the underlying network environment of the DDoS solution operates on a "flow-state" basis. In explaining the term "flow-state," a "flow" can be described as a stream of IP packets going from a particular source IP address and port to a particular destination IP address and port, in which all of the packets are using the same protocol (e.g., voice call, video call, file transfer, or web access). A flow-state router will thusly route flows, and not packets, and keeps state information on every flow (i.e., updated as every packet belonging to the flow) traveling through the system. State information may include, but is not limited to, forwarding, Quality of Service (QoS), application specific information and information about traffic type, traffic rate, application, and service needs. For additional details, please refer to U.S. Pat. No. 6,574,195 (application Ser. No. 09/552,278), U.S. Pat. No. 7,126,918 (application Ser. No. 10/086,763), and U.S. Pat. No. 7,813,356 (application Ser. No. 11/533, 346) entitled "MICRO-FLOW MANAGEMENT" (under "Cross-references").

In one embodiment, the first local-tier mechanism 140A-N is a flow-state router. A flow is automatically established when the first packet of a flow traverses the flow-state router, which then labels a flow with a unique header (e.g., five tuple header containing source address and port, destination address and port, protocol type) and creates a unique record of the flow's state information. The cumulative statistics of each flow record can be combined to form various types of "aggregate data", which can be classified according to its source (SA), destination (e.g., DA), etc. In some instances, the flow-state router updates the record whenever that particular packet of the flow (or a new packet) traverses the first tier local mechanism 140. In addition, the flow-state router can apply a specific treatment or action to the entire flow (i.e., every packet in it) based on a classification, rule, or policy, etc. In these instances, the flow-state router reserves the appropriate resources needed to apply the policy so as to guarantee the resources' availability for subsequent packets in the flow.

As such, the flow-state router can, in some embodiments, operate differently in comparison to traditional routers well-known in the art. For example, while traditional routers perform routing table lookups on every packet and forward every packet that is individually encountered, flow-state routers can perform one look-up for the first packet of a new flow, save the result/state in a flow record and then process all subsequent packets of the flow in accordance to specific policies, application needs, control parameters, assigned QoS profiles, or other guidelines saved in the flow record without incurring lookups again. In addition, flow state information for each flow can be redirected to an internal or external device for further monitoring, logging, and analysis—all such flow information is the most accurate snapshot of traffic passing through the router.

Figure 2A:
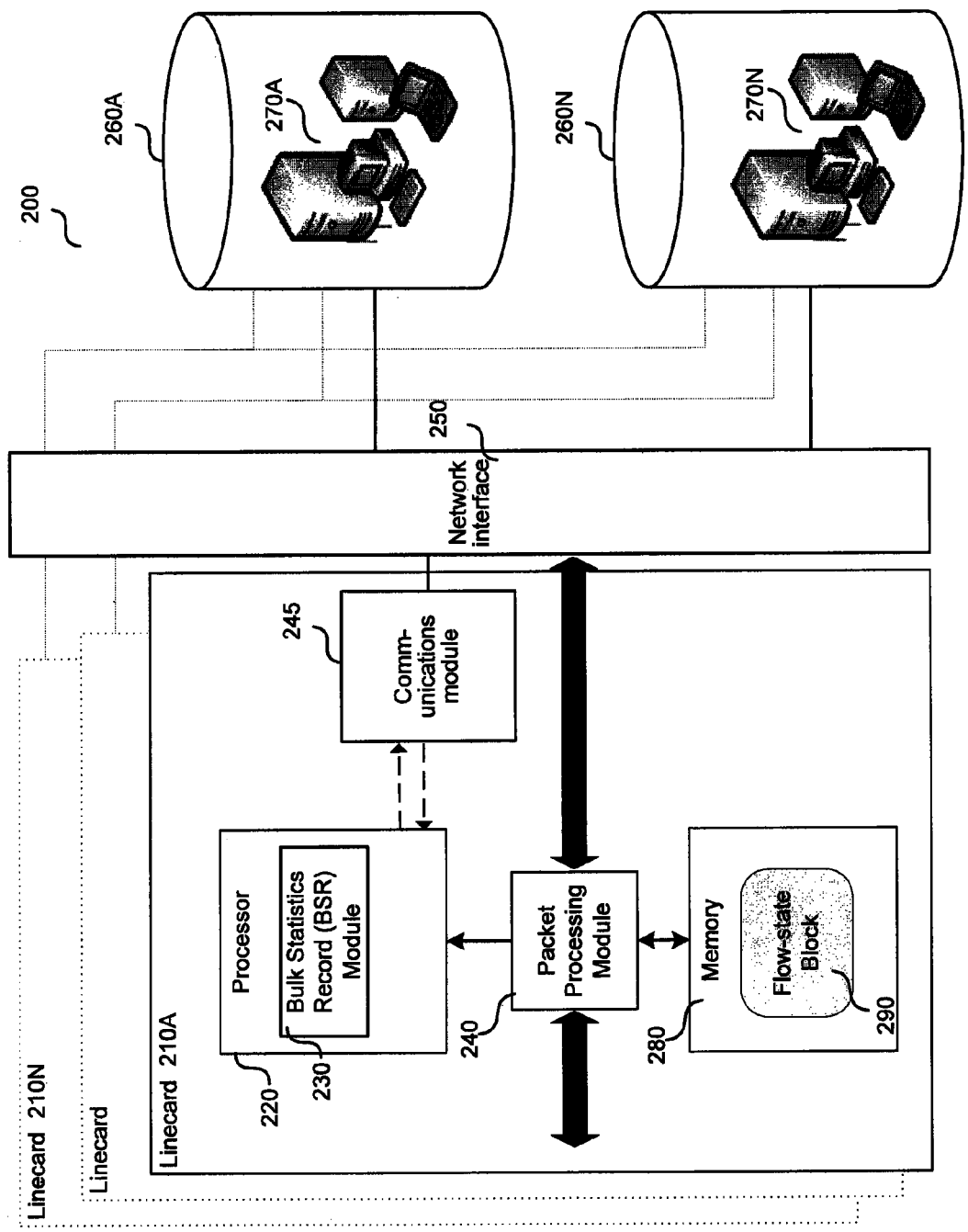
FIG. 2A depicts an example block diagram illustrating a system for detecting and mitigating a high-rate DDoS attack.

FIG. 2A depicts a simplified block diagram illustrating a system 200 for detecting and mitigating a high-rate DDOS attack. In this embodiment, the DDoS solution 150 is a composite approach of both hardware and software to detect and mitigate high-rate DDoS attacks. However, this combined hardware and software configuration is solely illustrative of an example embodiment and does not limit the invention to this specific implementation. The local-tier mechanism 140 can be an infrastructure of hardware, such as one or more linecards 210 (e.g., Sable Network's S-Series line card) for maintaining flow state of millions of flows. In another embodiment, the DDoS solution further includes a global-tier mechanism 160 including software 270A-N such as Sable Network's Service & Application Vision [SAVi] software, to monitor, analyze, and control individual or aggregate flows. As shown in FIG. 2A, the software 270A-N can be implemented on an external apparatus 260A-N such as one or more servers and the software 270A-N can be partially or wholly internal to one or more servers. In other embodiments, the local-tier mechanism and the global-tier mechanism may be a fully integrated solution.

In FIG. 2A, the local-tier mechanism includes one or more linecards 210A-N communicatively coupled to the global tier (e.g., external apparatuses 260A-N) via a network interface 250. Each linecard 210 includes a communications module 245, Bulk Statistics Record (BSR) module 230 executed by a general purpose processor 220, a packet processing module 240 with associated functions (including traffic classification, forwarding, and QoS), a memory 280 including a flow-state block 290 (see related patents under "Cross-references" for more details). Additional or fewer modules may be included in addition to the presence of a firewall (not shown). Details regarding each of these components are discussed further below.

Local-Tier Detection and Mitigation

As discussed above, the DDoS solution 150 includes local tier 140 detection and mitigation. The detection phase monitors and updates flow data in a system by monitoring real-time statistics. The detection phase also includes identifying anomalous traffic patterns in which more than one anomaly algorithms are implemented to detect deviations in traffic. As an example, an algorithm may define "normal" traffic conditions to be a predetermined proportion of sent packets/flows to number of bytes in a given observation period on a specific incoming/outgoing interface or destination address [DA] (server). As such, an "attack" can be considered to be any deviation from "normal" by a certain factor.

In one embodiment, the local tier 140 detection is performed by one or more linecards 210A-N that are integrated into a device (e.g., flow router 140) in the system (termed "inline"). Given the linecard's 210 position in the system, it can act as a first line of defense and quickly identify anomalous traffic patterns within a short time (e.g., tens of seconds).

In the example of FIG. 2A, the linecard 210 includes multiple modules and/or components that may be coupled to one another and each is illustrated as being individual and distinct. However, in some embodiments, some or all of the components, and/or the functions represented by each of the components can be combined in any convenient and/or known manner. For example, the modules of the linecard 210 may be implemented on a single device, multiple devices, and/or in a distributed fashion.

Thus, the blocks/modules of the linecard 210 are functional units that may be divided over multiple devices and/or processing units or combined on a single device. Furthermore, the functions represented by the blocks/modules can be implemented individually in hardware, software, or a combination of hardware and software. Different and additional hardware modules and/or software agents may be included in the linecard 210 without deviating from the spirit of the disclosure.

In one embodiment of a linecard 210, the packet processing module 240 collects flow data by monitoring a stream of IP packets. By operating on a flow-state basis, the packet processing module 240 processes the flow record data for every individual flow, which in turn can be accumulated to create aggregate data (see above for description of aggregate data). The packet-processing module 240 maintains this record of individual flow and aggregate data (based on Source Address, Destination Address, protocol or any other combination of fields from the packet header) for further analysis and periodically exports this data to the BSR module 230, discussed in detail below.

In one embodiment, the packet processing module 240 is a custom packet processing ASIC which provides a "sample" (i.e., up-to-date flow state information at a given time) of a flow to the BSR module 230. As an example, for each flow, the packet processing module 240 provides different types of samples, such as a "first sample" that is the very first sample of a flow, a "middle sample" that is a statistically chosen from the flow (e.g., sent when every Nth packet of a flow is received), and a "close sample" that is a final or summary sample when the flow ends or ages out. Each sample sent to BSR module 230 contains information from the flow state block 290 maintained and updated by the packet processing module 240. Flow state samples are, therefore, sent to the BSR module 230 for each and every flow, thus ensuring the accuracy of aggregate data that is maintained and used by the BSR 230.

Figure 2B:
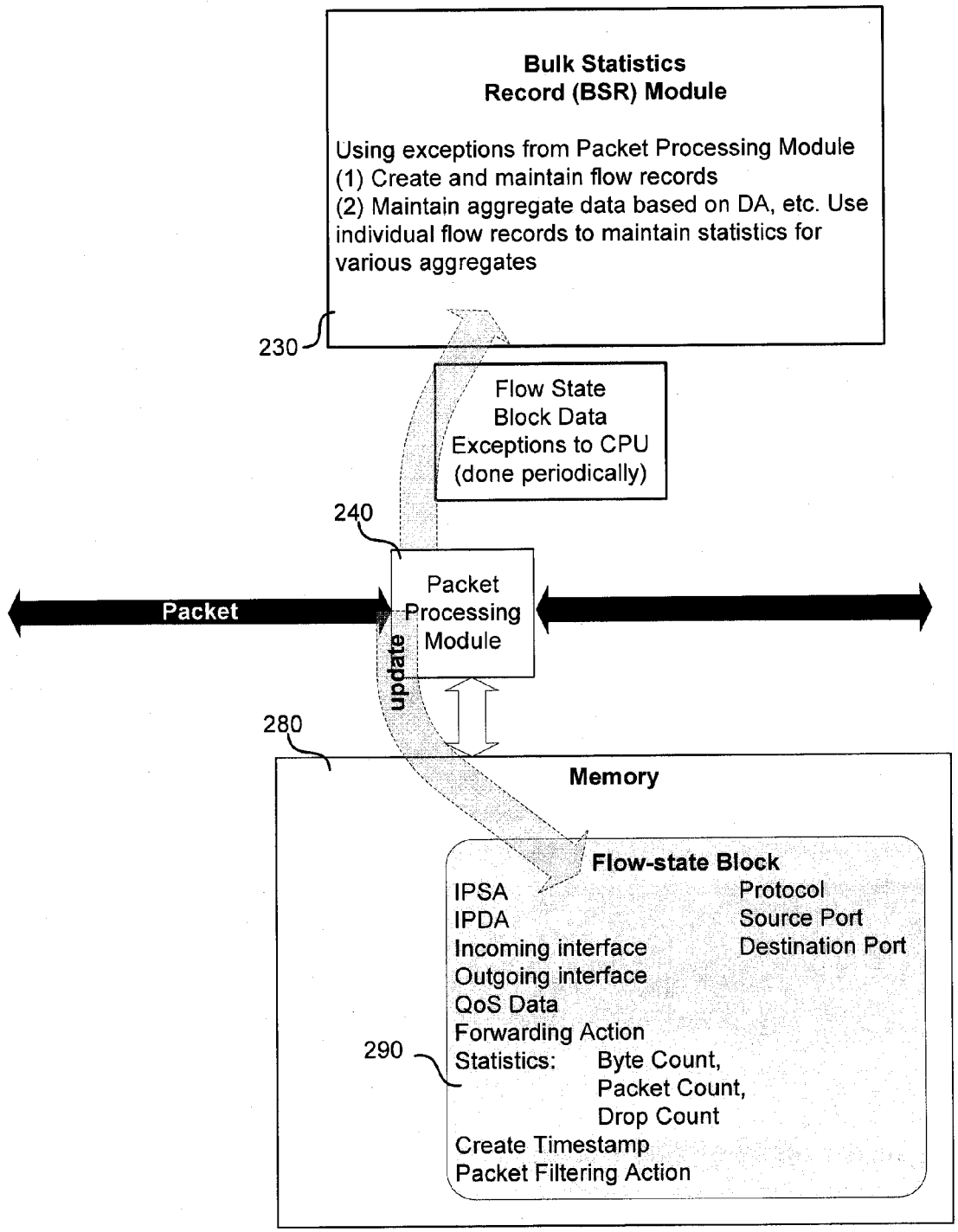
FIG. 2B depicts an example block diagram illustrating detailed example processes of the BSR module, packet processing module, and flow-state block.

FIG. 2B depicts an example block diagram illustrating detailed example processes of the BSR module 230, packet processing module 240, and flow-state block 290 included in the memory 280. FIG. 2B shows first, middle, close samples coming from the flow-state block 290 directly. These samples are received by the BSR module 230, whereby it maintains individual flow records and filtered aggregate records (based on DA, SA). Notably, in a preferred embodiment, the "samples" referred to herein are accurate flow state data that is sent periodically, and are not statistically-sampled packets.

As shown in FIG. 2A, the linecard 210 also comprises a memory 280 which includes a flow-state block 290. The flow-state is created and updated as packets belonging to the flow are received by packet processing module 240. As discussed above, the state information maintained by the flow-state block 290 includes information about traffic type, traffic rate, application, and service needs. Specific examples of state information that may be stored in the flow-state block 290 (also shown in FIG. 2B) include IPSA, IPDA, incoming (i.e., ingress) interface, outgoing (i.e., egress) interface, quality of service (QoS) data, forwarding action, packet filtering action, timestamp-creation, statistics (e.g., byte, packet, or drop count), protocol, source port, destination port and the like. In the example above, the first, middle, and close samples can contain the following information: flow keys to identify the flow such as source IP address, destination IP address, source port number, destination port number, IP protocol, egress and ingress interface information, flow statistics such as cumulative number of packets in flow forwarded until that sampling instance, cumulative number of bytes in flow forwarded until that sampling instance, cumulative number of packets dropped until that sampling instance, and Quality of Service (QoS) data that includes jitter, flow rate, packet arrival/departure timestamps etc.

The linecard 210 also comprises a general purpose processor 220 executing a Bulk Statistics Record (BSR) module 230. The BSR module 230 receives sample information on flows (e.g., flow state records) from the packet processing module 240 and can accumulate the received samples into continuous flow records and aggregate records. The BSR module 230 then computes ratios of various attributes of the aggregate records (or other similar records towards the server) in a set period of time. The BSR 230 then operates on these attribute ratios using a variety of algorithms to detect traffic anomaly towards the protected server DAs. As shown in FIG. 2B, the detection logic in the BSR module 230 comprises of computing traffic deviation ratios using data harvested from the packet processing module 240 and running various anomaly algorithms (discussed in more detail below). The BSR module 230 can run anomaly algorithm(s) at different levels of granularity to detect any traffic deviations from "normal." Additional features peripheral to this main function can be performed by the BSR module 230, such as providing periodic reports of flow or aggregate records to other modules.

Running detection algorithms on the BSR module 230 does not degrade the forwarding performance or processing capabilities of the packet processing module 240, since the anomaly detection is not occurring in the main data path of the packet processing module 240. In one embodiment, the BSR 230 harvests flow data for only interested flows using classification/filtering criteria, thus conserving bandwidth between the packet processing module 240 and the BSR 230. Moreover, in order to detect deviations in traffic, the BSR module 230 harvests statistics at different levels of granularity (e.g., interface [such as network interface 250], Source Address [SA], Destination Address [DA], etc.) using flow state samples obtained from packet processing module 240. Although the techniques described herein refer primarily to the DA aggregate level (e.g., monitoring traffic to one or more servers being protected), one skilled in the art will understand that the techniques may be practiced in other ways, such as on the interface level (e.g., monitor network interface 250 traffic coming from or going to a server).

In FIG. 2A, the linecard 210 includes a communications module 245 or a combination of communications modules communicatively coupled to the network interface 250 to manage a one-way, two-way, and/or multi-way communication sessions over a plurality of communications protocols. In one embodiment, the communications module 245 transmits and/or receives data (e.g., information, commands, requests, and/or messages) over a network.

Since the communications module 245 is typically compatible with receiving and/or interpreting data originating from various communication protocols, the communications module 245 is able to establish parallel and/or serial communication sessions with operators of remote client devices for data and command exchange (e.g., alerts and/or operator commands).

In FIG. 2A, the network interface 250 can be one or more networking devices that enable the linecard 210 to mediate data in a network with an entity that is external to the linecard, through any known and/or convenient communications protocol supported by the linecard and the external entity. The network interface 250 can encompass one or more of a network adaptor card, wireless network interface card, router, access point, wireless router, switch, multilayer switch, protocol converter, gateway, bridge, bridge router, hub, digital media receiver, and/or repeater.

A firewall, can, in some embodiments, be included to govern and/or manage permission to access/proxy data in a computer network, and track varying levels of trust between different machines and/or applications. The firewall (not shown) can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand. In some embodiments, the functionalities of the network interface 250 and the firewall are partially or wholly combined and the functions of which can be implemented in any combination of software and/or hardware, in part or in whole.

Figure 3:
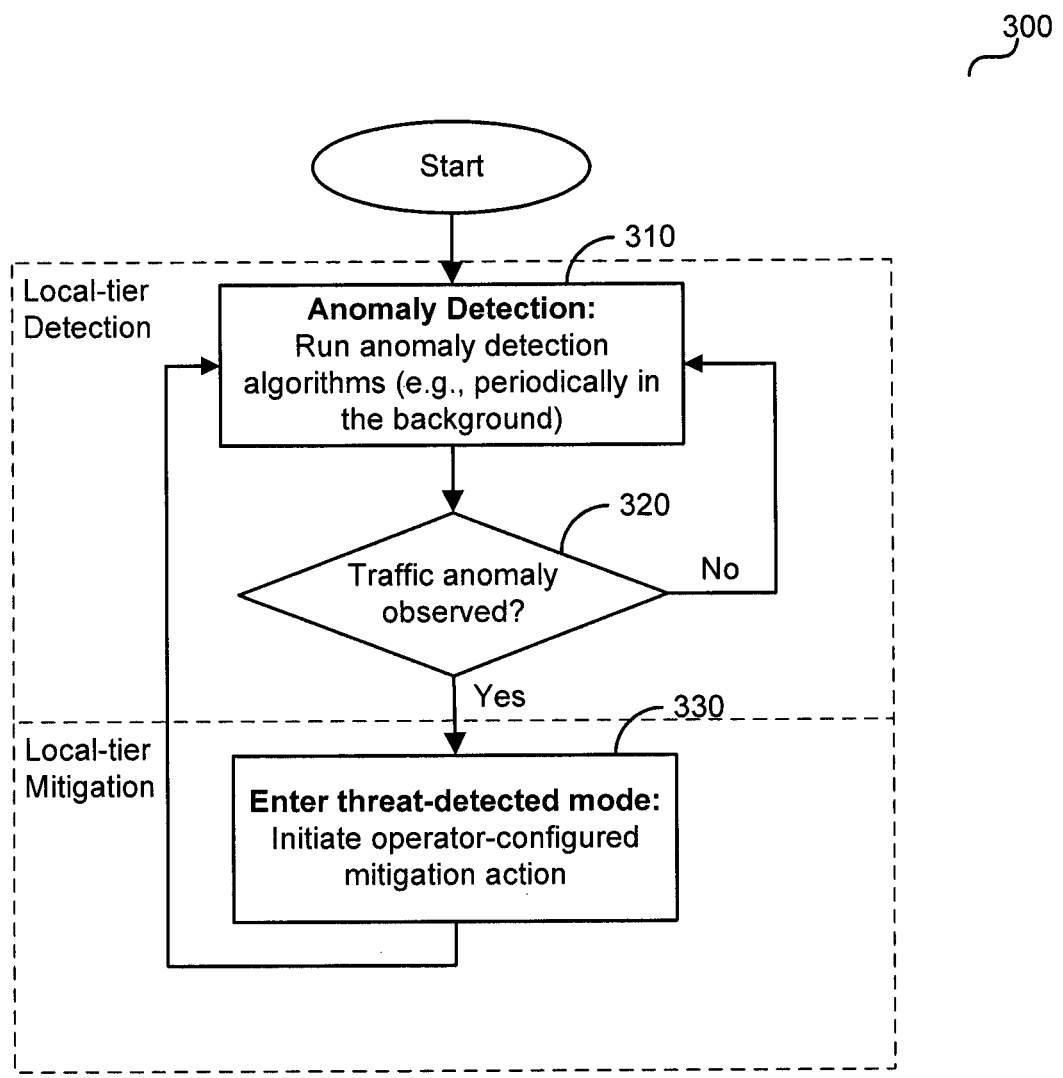
FIG. 3 depicts a flow diagram illustrating an example process of local-tier detection and mitigation, according to one embodiment.

FIG. 3 depicts a flow diagram illustrating an example process 300 of local-tier detection and mitigation, according to one embodiment.

At block 310, the process starts in normal mode wherein no DDoS attack is present. As flow records are obtained from packet processing module 240 to BSR module 230, the system (BSR module 230) runs more than one anomaly detection algorithms. The frequency with which the anomaly detection algorithms are run can vary. For example, the system can run anomaly algorithm(s) periodically (i.e., every certain time period) in the background. As another example, the system can continuously run the algorithm(s).

During local-tier detection, more than one algorithm is applied to monitor and detect a traffic anomaly, and ultimately a DDoS attack. Among the many detection algorithms proposed in literature, all detection algorithms are based on several assumptions and have specific constraints. Each algorithm is plagued with a certain false positive and false negative rate. As such, multiple algorithms are employed so that a DDoS attack can be identified with a high level of certainty.

In one embodiment, simple algorithms requiring minimal processing overhead are used to quickly perform a first pass detection. In another embodiment, several complex algorithms are deployed in parallel at the same time. In such an embodiment, if a majority of algorithms deem the traffic deviation to be an attack, this is often a strong indication of an attack. On the other hand, if the number of algorithms that deem the traffic deviation as an attack is a minority, this often signifies a lower risk of a real attack and/or indicates a false positive.

A deviation in the traffic ratios is often indicative of a potential threat. At decision block 320, the system (e.g., the BSR or other such module where algorithms are run) determines from the running algorithm(s) whether a traffic anomaly is observed. Further details regarding the process of identifying a traffic anomaly is described below relating to FIG. 4. In general, a traffic anomaly is observed if one or more algorithms detect attack traffic at a given level (e.g., DA aggregate level).

If a traffic anomaly is not observed (block 330—No), the system returns to block 310 where it continues to run anomaly detection algorithms. If a traffic anomaly is observed (block 320—Yes), the system proceeds to perform local-tier mitigation. Upon the determination that a traffic anomaly has been observed (see FIG. 4), the system enters a threat-detected mode 330; whereupon operator-configured mitigation actions can be initiated. In addition, a proactive alert can be issued via activity updates/logs and an operator can be notified at the first sign of any unusual activity. Further details regarding the processes of this threat-detected mode is described below relating to FIG. 5.

Figure 4:
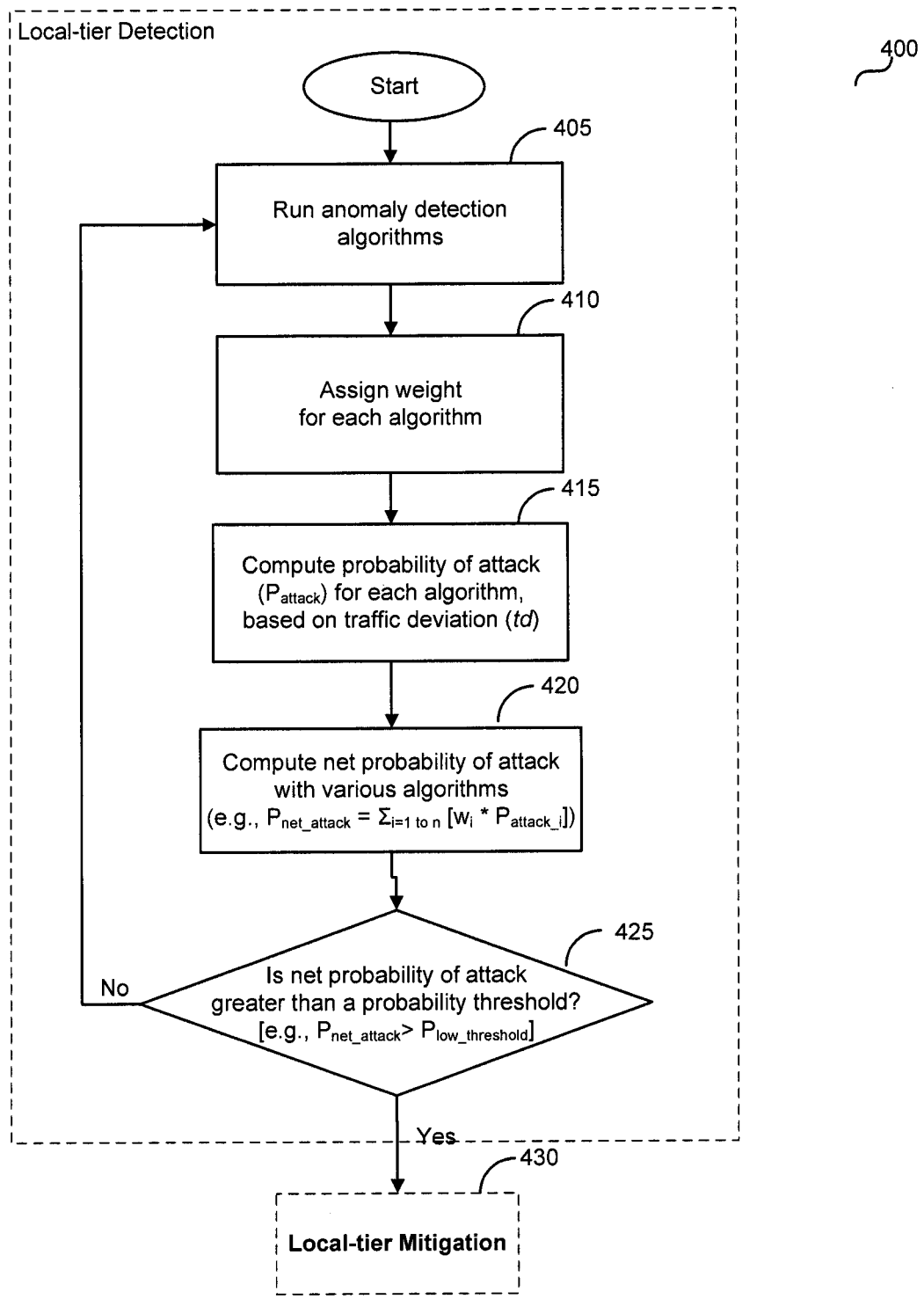
FIG. 4 depicts a flow diagram illustrating a detailed example process of local tier detection, according to one embodiment.

FIG. 4 depicts a flow diagram illustrating an example process 400 of local-tier detection, according to one embodiment.

Figure 5:
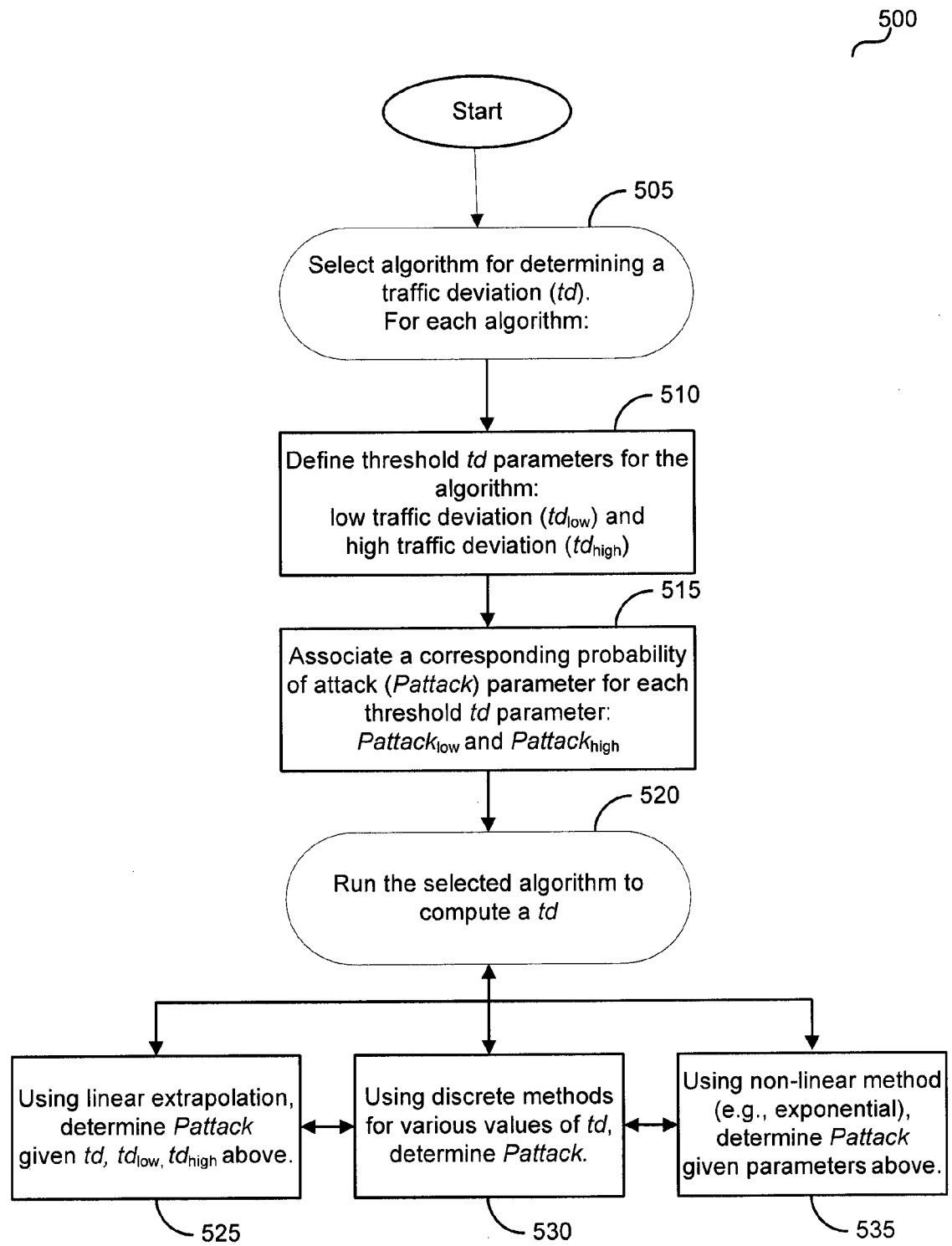
FIG. 5 depicts a flow diagram illustrating an example process of computing an attack probability from a traffic deviation parameter.

Each anomaly detection algorithm yields an associated traffic deviation factor, and from this traffic deviation factor, a probability of attack can be computed as shown in FIG. 5. By using each algorithm's probability of attack and by running several algorithms, a net (overall) probability of attack can be computed. In one embodiment, the example process of local-tier detection occurs at the DA level and uses a combination of algorithms and heuristics. Certain anomaly algorithms as well as particular heuristic detection algorithms can be selected for use. After each anomaly algorithm and heuristic algorithm is assigned a weight, a net probability of attack can be computed. The below instructions offer a simplified example of an illustrative detection algorithm:

```
DAAggr:ddos_check( ){
   for every DA being monitored, periodically {
      run algo1;         //(algo_weight = w1)(P_attack_1=attack
      probability)
      run algo2         //(algo_weight = w2)(P_attack_2)
      run algo3;        //(algo_weight = w3)(P_attack_3)
      compute Pnet;     //(w1*P_attack1+w2*P_attack2+w3*P_attack3)
      if (Pnet>P_low_threshold)
         threat_detect = yes;
         activate mitigation;
      }}
```

At block 405, multiple (more than one) anomaly algorithms are run to detect traffic deviations such that the combination of algorithms can yield a greater likelihood of detection at a higher confidence level. Those skilled in the relevant art will recognize that multiple (more than one) anomaly detection algorithms can be run in various ways using different timing schemes (e.g., concurrently, serially, sporadically and the like).

The use of multiple algorithms for local-tier detection also allows for the prioritization of selected algorithms. At block 410, each algorithm that is used to detect an anomaly is associated with a weight (w) wherein the sum of all weights is equal to one.

In one embodiment, weights (w) can be assigned to an algorithm at block 410 based on a false positive rate. Each anomaly detection algorithm can posses a certain false positive rate (fp) (usually expressed as a percentage), whereby the lower a false positive rate, the more accurate the algorithm is. The false positive rate, in one embodiment, is a predetermined value that can be statistically defined or arbitrarily assigned by, for example, an operator or a creator of the algorithm.

To illustrate how weights (w) can be assigned to different algorithms based on a false positive rate according to one embodiment, Algorithm 1 ($Algo_1$) is well-known in literature and has a relatively low false positive rate of 10% ($fp_1$=0.1). Algorithm 2 ($Algo_2$), a series of flow heuristics monitoring, has a higher false positive rate of 20% ($fp_2$=0.2). Since $Algo_2$ has twice the false positive rate than $Algo_1$, $Algo_1$ is more accurate and thusly weighted two times more than $Algo_2$. That is, $w_1$ for $Algo_1$ is 0.67 and $w_2$ for $Algo_2$ is 0.33. In a different example, if both Algorithm 1 and Algorithm 2 have the same false positive rate of 10%, each algorithm can be assigned the same weight (i.e., $w_1$ and $w_2$=0.5). As another example, the weight assigned to an algorithm may be inversely proportional to the false positive rate ($w_1$ is proportional to $1/fp_1$). As still another example, weights may be assigned to each algorithm on a case-by-case basis, as shown:

|  | Algorithm 1 | Algorithm 2 |
| --- | --- | --- |
| User-configured | $W_1$ | $W_2$ |
| Default weight | 0.5 | 0.5 |
| In case of Enterprise deployment | 0.5 | 0.5 |
| In case of IX deployment | 0.3 | 0.7 |

How and what weight (w) is assigned to each algorithm may vary in different embodiments. In one embodiment, the weight can be manually assigned to by an operator. In another embodiment, a weight for each algorithm can be pre-assigned with default values. In yet another embodiment, the weights can be calculated and automatically assigned. In addition, the process of calculating and assigning a weight for each algorithm 410 can be an optional step that may be bypassed altogether. Also, the weight that is assigned may vary. In one embodiment, the weight can be an arbitrary value. In another embodiment, the weight can be a pre-determined parameter based on its efficacy in relation to other algorithms. For example, a larger weight is assigned to an algorithm or method that is relatively more effective in identifying an actual DDoS attack. Various modifications and combinations of these are possible as those skilled in the relevant art will recognize.

At block 415, a probability of attack ($P_{attack}$) is computed for each algorithm based on a traffic deviation (td) factor.

Each anomaly detection algorithm notes the traffic at a given level such as the DA-level (i.e., monitoring all traffic to the protected servers). For example, ingress and egress data are monitored at a particular node such that any change to this data can be potentially noted as an attack in accordance to the algorithm. The traffic pattern may be monitored with respect to number of bytes, packets, flows, rates over a certain period of time, or any combination thereof. As such, the "traffic deviation" (td) factor is an indicator of the current state of traffic patterns compared to a normal baseline and can serve as a measure of observed anomalous traffic. Thus, one can compute a td for each algorithm. An example process by which a probability of attack is computed in block 415 is illustrated in FIG. 5.

FIG. 5 depicts a flow diagram illustrating an example process 500 of computing an attack probability of an algorithm based on a traffic deviation parameter. Those skilled in the relevant art will recognize that the flow diagram of 500 may be modified or combined in various ways to suit the needs of an application. A multitude of anomaly algorithms with different approaches may be used. Some of these algorithms or heuristics may not explicitly define a traffic deviation parameter (td)—however, the current process involves extrapolating or modifying the algorithm to derive a td. Based on the td obtained, an attack probability is computed as discussed below. For example, attack probability calculations can be simultaneous such that more than one Pattack is computed at the same time.

At block 505, an algorithm is selected for which a traffic deviation, and thus a probability of attack are to be computed. At block 510, threshold traffic deviation parameters are defined for the algorithm. In one embodiment, a low-traffic deviation threshold ($td_{low}$) and a high-traffic deviation threshold ($td_{high}$) are defined. The low-traffic deviation specifies the lower threshold at which the anomaly algorithm may indicate a potential attack and the high-traffic deviation specifies the higher threshold at which the anomaly algorithm is known to indicate an attack. Those skilled in the relevant art will recognize the various ways of defining these parameters in different embodiments. In one embodiment, the thresholds can be manually assigned by an operator. In another embodiment, the thresholds for each algorithm can be pre-assigned with default values. In yet another embodiment, the thresholds can be calculated and automatically defined. In addition, the step of defining the thresholds for the algorithm 510 can be an optional step that may be bypassed altogether.

At block 515, a corresponding probability of attack (Pattack) parameter is associated to each threshold traffic deviation (td) parameter, such as a low-probability of attack ($Pattack_{low}$) and a high-probability of attack ($Pattack_{high}$), in accordance to one embodiment. The Pattack parameter represents the probability with which one can state that the traffic anomaly deviation, indicated by td, is an attack. For example, if Pattack is 0.7, it implies that there is a 70% probability that the anomalous traffic deviation seen is an attack and not a legitimate traffic surge. The low-probability of attack is the probability of attack when the traffic deviation is equal to $td_{low}$. For example, $Pattack_{low}$ value may be the lowest attack probability at which a mitigation action will be initiated. The high-probability of attack is the probability of attack when the traffic deviation is equal to $td_{high}$. For example, $Pattack_{high}$ may be the greatest attack probability at which one can state with certainty that the traffic anomaly seen is really an attack. Accordingly, there can be a more punitive mitigation action that can be enforced. Those skilled in the relevant art will recognize that how these parameters are defined may vary in different embodiments. In one embodiment, the parameters can be manually assigned by an operator. In another embodiment, the parameters for each algorithm can be pre-assigned with default values (e.g., 0.5, 1.0). In yet another embodiment, the thresholds can be calculated and automatically defined. At block 520, flow diagram 500 runs the algorithm selected in block 505 in order to compute a traffic deviation (td) factor.

Based on the computed td factor, the individual probability of attack for the selected algorithm can be derived in a variety of ways. In one embodiment, linear extrapolation is used at block 525 to determine the probability of attack (Pattack) through the following equations:

$$(A) = (td - td_{low}) * (Pattack_{high} - Pattack_{low})$$

$$(B) = (td_{high} - td_{low})$$

$$Pattack = \text{Minimum}(1.0, [(A)/(B) + Pattack_{low}])$$

In another embodiment, the probability of attack (Pattack) can be computed in a non-linear fashion at block 535 (e.g., exponential, other distribution). In parallel with, or as an alternative, the probability of attack can be determined at block 530 using discrete methods for various values of td.

To illustrate an exemplary Pattack computation, the following description explains how the probability of attack is calculated with an example algorithm, the C Kotsokalis algorithm (algorithm details below). In the C Kotsokalis algorithm, the following traffic ratios (monitored at the interface such as network interface 250 or aggregate level such as DA aggregate level) track each other closely when conditions are normal, wherein $B_{ratio}$, $P_{ratio}$, and $F_{ratio}$ are respectively ratios of byte, packet, and flow counts:

$$B_{ratio} = (\text{maximum bytes})/(\text{average bytes})$$

$$P_{ratio} = (\text{maximum packets})/(\text{average packets})$$

$$F_{ratio} = (\text{maximum flows})/(\text{average flows})$$

Also, traffic deviation can be defined as ($B_{ratio}/P_{ratio}$) and/or ($B_{ratio}/F_{ratio}$). Under normal traffic conditions, the traffic deviation is expected to be close to 1.0. When the traffic deviation is greater than 1.0, the traffic pattern indicates an anomaly in traffic that may be considered an attack.

In this example computation, the threshold td parameters and probability of attack (Pattack) parameters of blocks 510 and 515 are defined as follows: $td_{low}=1.25$, $td_{high}=1.75$, $Pattack_{low}=0.6$, and $Pattack_{high}=1.0$. Under the current scenario, the C Kotsokalis algorithm indicates a certain traffic pattern wherein the td calculated at block 520 is 1.48. In turn, the attack probability calculated using the linear extrapolation of block 525 {i.e., Pattack=Minimum (1.0, [(A)/(B)+$Pattack_{low}$])} is equal to 0.784. In other words, with the C Kotsokalis algorithm, there is a 78% chance that the anomalous traffic deviation is an attack.

After the individual probability of attack is computed for each of the multiple algorithms, a net probability of attack is then determined. Returning to block 415 in FIG. 4, a net probability of attack can be computed using the Pattack of each algorithm at block 420. In an embodiment discussed above wherein individual attack probabilities are derived from each algorithm and their corresponding traffic deviation (td) factor, a net attack probability is computed from these individual attack probabilities. In a scenario where n algorithms are used, a net probability of attack can be computed using the following equation: $P_{net\_attack} = \Sigma_{i=1 \text{ to } n} [w_i * P_{attack\_i}]$ i.e. $P_{net\_attack} = w_1 * P_{attack\_1} + w_2 * P_{attack\_2} + \ldots + w_n * P_{attack\_n}$ where $w_i$ is the weight assigned to algorithm i and $P_{attack}$ is the attack probability obtained for algorithm i. In addition, block 410 can determine the weight ($w_n$) assigned to each algorithm as previously discussed, wherein the sum of the weights of all algorithms ($\Sigma w_i$ from i=1 to n) is equal to 1.

At decision block 425, the system determines whether the net probability of attack is greater than a probability threshold. In one embodiment, this probability threshold is defined as $P_{low\_threshold}$ representing the minimum probability at which an operator determines a threat is detected and mitigation logic should come into force.

Defining the probability threshold parameters may vary in different embodiments. In one embodiment, the probability threshold can be defined by an operator. In another embodiment, the probability threshold can be pre-defined with a default value (e.g., 0.5 if the net attack probability is 50%) wherein a potential threat may be implied and the operator wants to enforce mitigation. In yet another embodiment, the probability threshold can be calculated and automatically defined. Various modifications and combinations of this are possible as those skilled in the relevant art will recognize.

If the system determines that the net probability of attack is greater than a probability threshold (block 425—Yes), then the system proceeds to perform local-tier mitigation (additional details are described further below). If the system determines that the net probability of attack is not greater than a probability threshold (block 425—No), then the system returns to block 405, whereupon the process of local-tier detection begins again and the anomaly detection algorithms are run. In general, the higher the net $P_{attack}$, the more punitive the mitigation can be. This is because a higher attack probability indicates a higher degree of confidence that the anomaly is really an attack.

Figure 6:
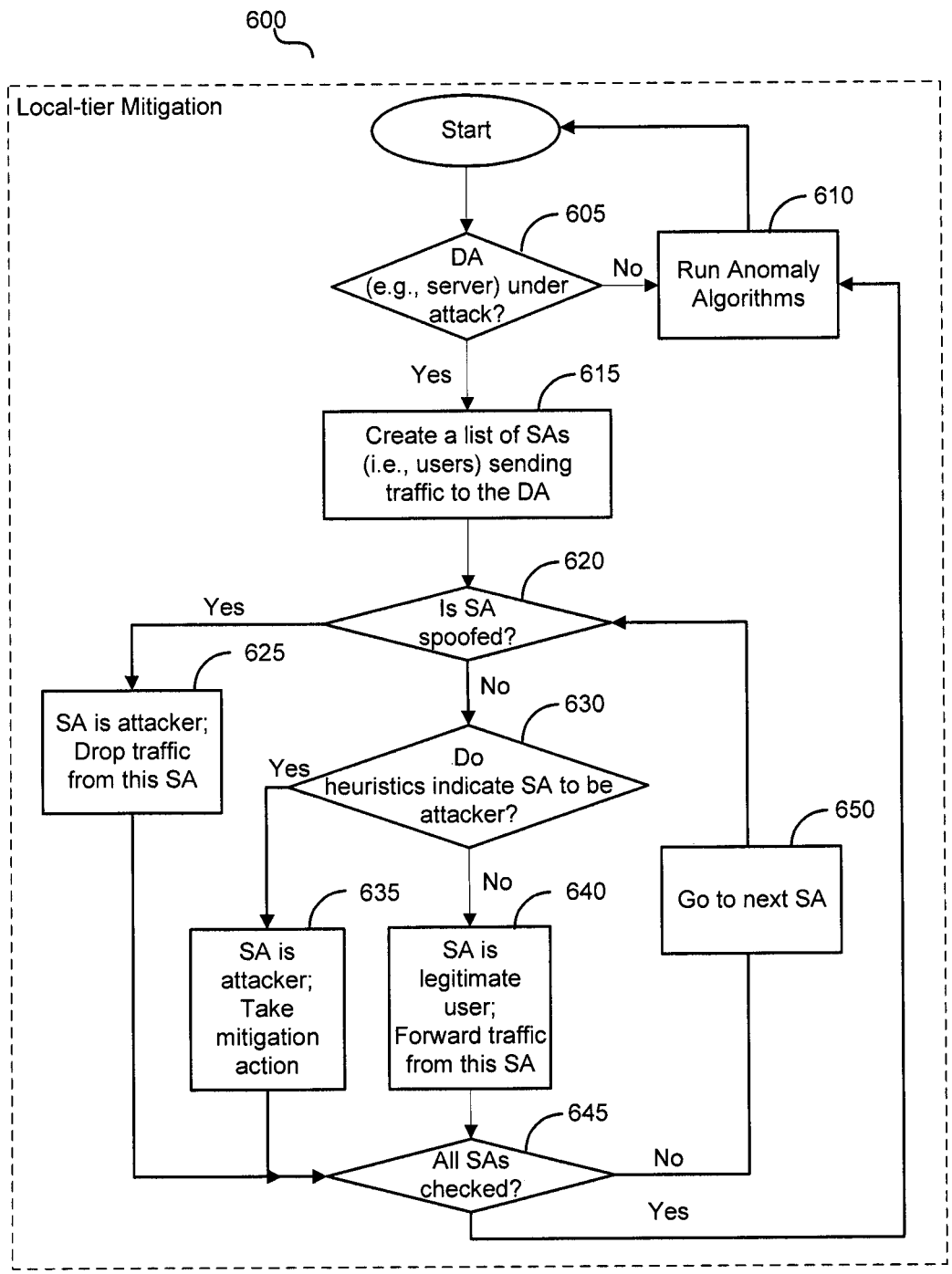
FIG. 6 depicts a flow diagram illustrating an example process of local mitigation, according to one embodiment.

FIG. 6 depicts a flow diagram illustrating an example process 600 of local-tier mitigation, according to one embodiment. After local-tier detection, any observed traffic anomalies on a certain level (e.g., DA) cause the system to enter a threat-detected mode and perform local-tier mitigation. The system enters the threat mitigation mode once $P_{attack}$ crosses the probability threshold as shown in block 425. This indicates that there is a real possibility of attack at the server (DA) being monitored (block 605). As such, when the system determines that a DA is under an attack (decision block 605—Yes), the system proceeds to maintain a list of users (or SAs) (shown in block 615) that are sending traffic to the victim server. This is done so that the system can monitor the SA traffic (to the attack victim server) to determine the attackers (SAs) involved in the attack. Abnormal traffic heuristics (at the source address SA or user level) are typically indicative that the particular SA is responsible for an attack and a mitigation action is typically enforced against the corresponding SA. When the list of attacker SAs is determined, an appropriate mitigation action can be taken. FIG. 6 primarily depicts local-tier mitigation related to a DA (i.e. based on observing traffic anomalies at DA aggregate level); however, one skilled in the art will recognize that the techniques may be practiced on other levels (such as the interface level whereby an interface is a network interface such as 250 shown in FIG. 2A).

Alternatively, if the DA is not perceived to be under attack (decision block 605—No), this may indicate "no attack" and the anomaly algorithms can continue to be executed (block 610). Note that additional heuristic measurements such as low average packet size, large percentage of TCP or UDP packets, or a high number of flows, etc. may be considered as part of anomaly algorithms being run as well, in order to detect traffic deviations.

After creating a list of SAs (e.g., user source addresses) sending traffic to the victim server DA (destination address that is under attack) in block 615, the local mitigation process in FIG. 6 proceeds to decision block 620 to determine whether the SAs involved in the high-rate DDoS attack are spoofed. The system can determine whether the attacker is using a legitimate or spoofed address in various ways as known in the art. In one embodiment, a reverse path check of the source address can be performed to determine if the attack is from a spoofed address. In other embodiments, TCP SYNs are correlated with TCP SYN+ACKs or other significant discrepancies in traffic ratios are identified to detect spoofed SAs.

If the attack sources from spoofed addresses (block 620—Yes), the mitigation algorithm can apply a policy of dropping the flow (block 625), in accordance to one embodiment. This can be a default action. In another embodiment, the mitigation algorithm can send an alert to external servers and the system logs the details of the spoofed address to trace its origin. If there is no spoofing (block decision 620—No), it indicates that the SA under consideration is using a valid IP address for its traffic to the server. The task now is to determine if this user (SA) is a legitimate user trying to access the server or if it is an attacker (i.e., compromised user). The system determines if the heuristics indicate the SA to be an attacker or not at block 630.

If the heuristics do not indicate the SA to be an attacker (block 630—No), then the source can be deemed to be legitimate and the system forwards traffic from this SA (block 640). The system next decides at block 645 whether all SAs have been checked. If not (decision block 645—No), then the system checks the next SA on the list at block 650 and repeats the evaluation process starting at block 620 for each SA. After all SAs have been checked (decision block 645—Yes), the system returns to running anomaly algorithms at block 610 and determines whether a noticeable deviation in traffic can still be observed (e.g., is the DA still under attack). The process can repeat again and a new list of SAs (which may be different each time depending on which SA is sending traffic to the server) is created again (block 615) for which to apply local-tier mitigation policies.

If the heuristics indicate that the SA is an attacker, the system can automatically apply a DDoS mitigation policy (block 635) that dynamically controls the attack traffic. Some of the possible actions that can be specified in the policy can include:

Limiting the rate of traffic from a given SA to the DA under attack

Limiting the number of flows coming from the given SA to protect the victim servers and other appliances in the path Detecting and transmitting an alert for internal or external monitoring Generating and exporting specific flow records from this SA (and/or DA) for more detailed monitoring and analysis Mirroring or re-directing specific flows from this SA for further data process Perform Connection Admission Control (CAC) on new flows from this SA with a certain probability Log ("syslog") attacker information in detail Dynamically equalize bandwidth ("bandwidth-equalization") by reducing bandwidth from this SA by an amount given by traffic deviation Drop packets with a certain drop probability Rate-limit traffic to a certain bandwidth for traffic from this SA The below instructions offer a simplified example of configuring a mitigation profile with some of the actions from above:

```
forwarding ddos-mitigation profile <name>{
    destination-address<list of addresses>    /*Protected Destination
Addresses (hosts)*/
        term XX {
            attack-probability{
                less-than <1.0>;
                greater-than <0.8>;
            }
            then {
                cac;               /*for new flows*/
                syslog;
                bandwidth-equalization;     /*for existing flows */
            }}};
```

This is an example of an operator-configured mitigation policy that lists a set of DAs that need to be monitored for attacks. If the attack probability ($P_{attack}$) is greater than 0.8, up to the maximum value of 1.0, then the configured action to be enforced on traffic from the attacker SAs include CACing (connection admission control of new flows, reducing bandwidth) by an amount determined in proportion to the traffic deviation factor td and logging the attacker (SA) details.

In one embodiment, because the detection logic is based on a local view of activity, the mitigation action taken can be milder and less robust; at least until the activity is further validated as an attack by the global tier mechanism. As will be described below, the intensity of the mitigation policy can be adjusted.

In another embodiment, the local-tier mitigation phase includes the ability of the operator to customize the mitigation policies to flexibly allow a range of policies. In one embodiment, the operator configures the mitigation action on the impacted SAs (attackers) with the server DA being the victim of the attack, based on differing attack probability values.

TABLE 1

Operator Customization

| | Probability of Attack (attack-probability) | Mitigation Action |
|---|---|---|
| Threshold 1 | If attack-probability >90% | Reduce bandwidth from each attacking SA by 70%; drop all traffic for spoofed |
| Threshold 2 | If attack-probability between 80% and 90% | Reduce bandwidth from attacking SAs by 50% |
| Threshold 3 | If attack-probability between 70% and 80% | Reduce bandwidth from attacking SAs by 30% |
| Threshold 4 | If attack-probability <70% | No Action; alert/log |

Table 1 illustrates another example of a customized mitigation policy. In this embodiment, specific thresholds of attack probabilities correspond to different mitigation actions. For example, a probability of attack that is greater than 90% corresponds to an action to reduce bandwidth from attacking SA by 70%; an attack-probability between 80%-90% corresponds to an action to reduce bandwidth from attackers by 50%; an attack-probability between 70-80% corresponds to an action to reduce attacker bandwidth by 30%; and an attack-probability less than 70% corresponds to no action. In turn, parameters such as attack-probability at which to apply mitigation, mitigation actions, and bandwidth reduction percentage are individually configurable. In another embodiment, if the mitigation policy is not specifically configured, a default mode automatically applies whereby details of every attacker are logged.

Beyond a first pass at detection and mitigation, the local tier mechanism 140 can selectively send aggregate data for anomaly analysis by the global tier. For example, the local tier mechanism can send flow data on just the top heavy users to the global tier mechanism (in contrast to data of every user) for an in-depth anomaly analysis.

Global Tier Detection and Mitigation

As discussed above, the local-tier mechanisms are based on a local view of traffic destined to a particular node (e.g., server DA, interface). In addition to the local tier detection and mitigation, the DDoS solution can additionally include a global tier mechanism which holistically detects and mitigates a high-rate DDoS attack (shown in FIG. 1 as 160). Detection and mitigation of the global-tier mechanism is based on aggregating data from multiple local tiers and provides a more comprehensive view of traffic to a particular node (e.g., server, interface). Using the information from multiple local tiers, the global-tier can similarly use more than one algorithm to correlate and analyze flow data to detect and mitigate a DDoS attack.

In reference to FIG. 2A, the global tier mechanism (e.g., 160 in FIG. 1) can identify and/or control the high-rate DDoS attack with software 270A-N running on external server(s) 260A-N. The external server(s) 260A-N may store information such as software, databases, system information, descriptive data, images, video, and/or any other data item utilized by the server 260 for operation. The global-tier mechanism(s) 260A-N can receive data from one or more local tiers 210A-N of one system or from multiple systems (not shown).

Databases may be managed by a database management system (DBMS), for example, but not limited to, Oracle, DB2, Microsoft Access, Microsoft SQL Server, PostgreSQL, MySQL, FileMaker, etc. and can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package.

The external server(s) 260A-N can be implemented using one or more processing units, such as server computers, UNIX workstations, personal computers, and/or other types of computers and processing devices. In the example of FIG. 2, the server 260 includes multiple components and/or devices that may be coupled to one another and each is illustrated as being individual and distinct. However, in some embodiments, some or all of the components, and/or the functions represented by each of the components can be combined in any convenient and/or known manner.

Thus, the components of the server(s) 260A-N are functional units that may be divided over multiple devices and/or processing units. Furthermore, the functions represented by the devices can be implemented individually or in any combination thereof, in hardware, software, or a combination of hardware and software. Different and additional hardware modules and/or software agents may be included on the server(s) 260A-N without deviating from the spirit of the disclosure.

As discussed above, the local-tier mechanism 140 can export individual flow and aggregate data (such as DA aggregates) to the global-tier mechanism 160 for additional monitoring and analysis on a more comprehensive level. In comparison to the local tier, the global tier utilizes a more comprehensive approach which holistically detects and mitigates a high-rate DDoS attack. For example, the global tier, receiving data from multiple linecards in a system and/or from multiple systems, can evaluate and analyze the empirical data of every node within the network. Further, the global tier can initiate specific mitigation policies localized to a particular node. The global-tier mitigation policies are very similar to those of the local-tier in that multiple algorithms are used to determine a net attack probability.

Figure 7:
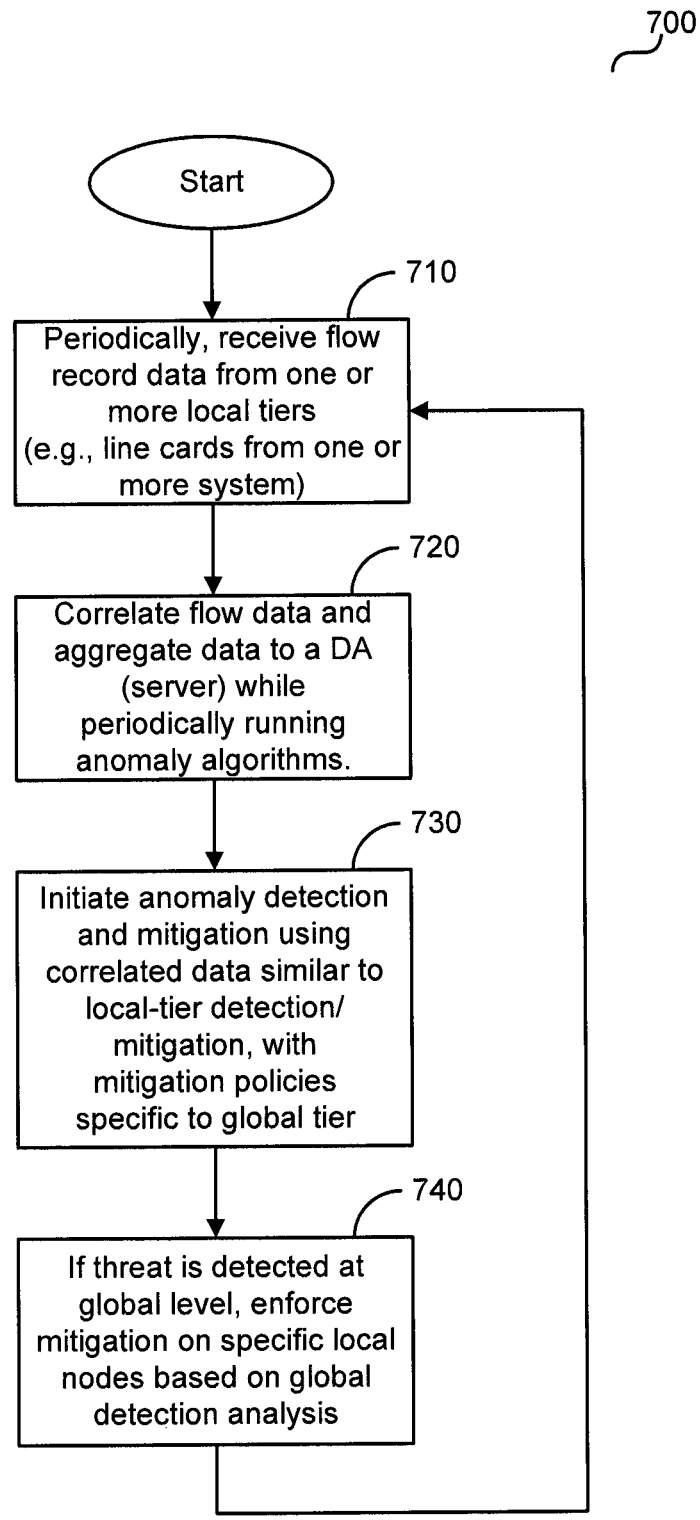
FIG. 7 depicts a flow diagram illustrating an example process of global-tier detection and mitigation, according to one embodiment.

FIG. 7 depicts a flow diagram illustrating an example process of global-tier detection and mitigation, according to one embodiment. During the detection phase of the global tier, software 270 on external server(s) 260A-N can periodically receive individual flow records and/or aggregate data (e.g., DA-based) from one or more local tier mechanisms (e.g., FIG. 2A linecards 210A-N). As shown in FIG. 7, flow record data from one or more local tiers are received at block 710. In one embodiment, global tier detection can be customized to monitor the aggregate data for only the top N users (e.g., N=100) in contrast to aggregate data for every user. In a further embodiment, sorted aggregate data for the top N users is received based on several different criteria. Examples of criteria include heavy byte usage, heavy flows per user, and the like.

In addition, the global tier can receive alerts from multiple linecards 210A-N when an anomaly is initially detected. In such an instance, the global tier can use the information from multiple local tiers to correlate and analyze the data using the anomaly algorithms, as is done at the local level. As shown in FIG. 7, flow data and aggregate data to a DA are correlated at block 720 while running anomaly algorithms. Further, any alerts can trigger the global tier to receive only the flow records of the specific addresses (i.e. source addresses, destination address, source-destination aggregates) for which the anomaly was detected.

During the mitigation phase, the global tier mechanism [e.g., software 270 on the external server(s) 260A-N] can address the detected anomalous traffic patterns identified during the global detection phase. At block 730, the initiated anomaly detection and mitigation tactics are similar to local-tier detection and mitigation, but incorporate mitigation policies specific to the global-tier. In one embodiment, the software can apply a more refined policy to control only the specific flows or flows-aggregates while allowing other non-anomalous flows to pass normally (thus, continuing access to the non-affected devices or by legitimate non-attacking users). In addition, the global mitigation phase can apply any of the mitigation policies available on the local level. As indicated in block 740, such a global mitigation policy may be applied to one or more specific nodes based on information on the node that most contributed to the attack traffic.

After Detection and Mitigation of a High-Rate DDoS Attack

After the local and global-tier mitigation policies begin to take effect, the traffic patterns (e.g., computed ratios/thresholds) monitored by the local and global tier detection phases should begin to return to a "normal" state as the DDoS attack subsides. With the traffic patterns returning to normal (as indicated by the computed ratios and traffic deviation parameters returning to normal baseline values), any mitigation policies implemented in the local and global tier of the DDoS solution 150 can be terminated. In one embodiment, the DDoS solution 150 can automatically suspend any mitigation policies that were applied. In another embodiment, control of the mitigation policies can be transferred to an operator for manual or real-time handling. In a case where indicators of an attack remain, mitigation policies can continue to be implemented until traffic patterns return to normal.

Detection Algorithms

The following description of detection algorithms is not intended to be comprehensive or to limit its implementation to the precise form disclosed—only a small sample is presented. Moreover, aspects of each algorithm may be implemented in whole or in part. Further, all of the algorithms and heuristics may be performed for each, e.g., DA that is monitored, without loss of generality. In one embodiment, the Z Mao et al (hereinafter Z Mao) algorithm can be implemented in the detection phases of the DDoS solution to account for simple flow heuristics. The primary observations of Z Mao include the ideas that the majority of attacks (e.g., greater than 70%) last for less than an hour, use TCP, and TCP-based attacks primarily comprise of ACK or SYN floods. Additionally, packet rates are typically in the tens of thousands per second and maximum packet rates are approximately one million packets per second. Also, most attacks only consist of packets smaller than 100B.

The Z Mao algorithm presents a variety of indicators which would signify a possible DDoS attack. In one embodiment, a high packet rate in the tens of thousands per second or more is potentially an attack. In another embodiment, if more than 95% of packets in the flows are either ICMP packets or UDP packets originating from a large number of source IPs, this flooding of respective ICMP or UDP packets can also be considered an attack. In other embodiments, an attack can be signified by any of the following: if more than 90% of traffic is TCP and all TCP packets have a single flag (e.g., SYN, RST, ACK); if more than 80% of traffic has packets smaller than 100B; if a small percentage of ingress interfaces or DAs may carry more than 90% of attack traffic; or if targeted services include http, ssh, dns, or irc.

Another algorithm is by C Kotsokalis et al (hereinafter C Kotsokalis) and utilizes a threshold for detecting high-rate attacks to address Denial of Service (DoS) and DDoS attacks. The router-based detection algorithm correlates various network traffic attributes observed before and during the attack. For example, a pattern of byte, packet, and flow counts can be observed, collected, and analyzed in a backbone router for a week.

The details of the C Kotsoskalis algorithm can be implemented as follows. For traffic going from interface A to interface B (note that monitoring of traffic can be extrapolated to monitor traffic going to a specific server DA), an observation period (T) can be defined as the period during which the number of byes, flows, and packets are counted. The average number of bytes, flows, and packets are computed across several observation periods. In addition, the maximum number of packets/flows/bytes seen across all the observation periods are monitored and tracked. As such, ratio calculations of maximum bytes to average bytes (MaxBytes/AvgBytes), maximum flows to average flows (MaxFlows/AvgFlows), and maximum packets to average packets (MaxPkts/AvgPkts) can be computed.

In one embodiment, the aforementioned three ratios track each other fairly closely under normal traffic conditions. In other words, MaxBytes/AvgBytes is approximately equal to MaxPkts/AvgPkts, which in turn is approximately equal to MaxFlows/AvgFlows. In turn, a genuine increase in the number of packets or flows ought to correspond to a proportionate increase in the number of bytes.

In one embodiment, C Kotsokalis algorithm can be extrapolated at the DA level by monitoring the traffic ratios to a server (instead of monitoring at the interface level). In one instance, the C Kotsokalis technique flags any surge of activity and correlates the ratios of packets or flows with that of bytes to detect a high-rate attack. For example, if the ratio of MaxPkts/AvgPkts or MaxFlows/AvgFlows is a predetermined factor (e.g., 1.25×, 1.5×, 2×) higher than MaxBytes/AvgBytes, then the anomaly can be flagged as an attack. As previously discussed, the three ratios track each other pretty closely under normal conditions. However, because most high-rate attacks generate numerous connections (i.e., flows) with very few packets in each, the packet and flow ratios likely will not track the byte count in the event of an attack and thus, can be flagged as an anomaly.

Another known theory that can be implemented as an anomaly algorithm is the V Chatzigiannakis et al algorithm (hereinafter V Chatzigiannakis). The V Chatizigiannakis algorithm checks an entity, such as a user, computer, or link, for deviations from normal behavior and can be used for high-rate attacks. V Chatizigiannakis tracks packets and flows and monitors metrics such as the number of flows with a short lifetime, the number of flows with a small number of packets, a percentage of TCP/UDP traffic, and current packets/flows or average packets/flows from interface i to j. In addition, data structures can be used to implement V Chatizigiannakis such as, for example, a destination IP table which tracks the number of packets and flows for every pair of interfaces.

Another known theory that can be implemented as an anomaly algorithm is by Y Chen et al (hereinafter Y Chen). The algorithm monitors traffic for a "super flow" to cover all packets sharing the same n bit prefix in their IPDA. In addition, Y Chen watches for short term deviations from long-term average behavior. The algorithm can monitor all flows at each interface and counts the incoming/outgoing packets per time slot. If there is an abnormal increase in the incoming rate on a super flow, the router will check for a pattern of change and how it propagates through the system. In order to differentiate abnormal short term behavior from normal long term behavior, the algorithm defines an abnormal traffic increase as a deviation from an average (DFA). Moreover, Y Chen can use a running weighted average to describe long-term behavior.

While a DDoS solution is herein described as operating on a flow-state basis, the DDoS solution is not limited to this platform and can be adapted for other platforms, including legacy systems (e.g., legacy routers, Intrusion Detection, Intrusion Prevention and Anti-DDOS systems). Without loss of generality, although some algorithms are based on observing traffic deviation at a specific level (e.g., interface), the algorithms proposed can be adapted, modified, and/or extrapolated to monitor traffic deviations at other levels (e.g., DA).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this patent application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed:

1. A method of addressing a Distributed Denial of Service (DDoS) attack on a flow-state system comprising:
    generating a plurality of packet flows traveling through the flow-state system, each packet flow being generated as a first packet of the packet flow travels through the flow-state system, each packet flow having a sequence of packets that have matching attributes with each other;
    generating a plurality of flow-state records for the plurality of packet flows based on attributes associated with the plurality of packet flows, each flow-state record storing a set of attributes and a set of state information associated with a corresponding packet flow, each flow-state record being updated with state information of each packet of the corresponding packet flow, as each packet travels through the flow-state system;
    generating a plurality of aggregate records from the plurality of flow-state records, each aggregate record being generated by aggregating a subset of the plurality of flow-state records into the aggregate record, the aggregating based on a subset of the attributes used to generate the plurality of flow-state records;

monitoring the plurality of aggregate records at one or more nodes within a network in order to detect an anomaly in the plurality of aggregate records; and for each of the plurality of aggregate records:

executing a first anomaly algorithm, the first anomaly algorithm having a first associated weight, wherein executing the first anomaly algorithm comprises:

computing a first traffic deviation factor; and computing a first individual probability of attack based on the first traffic deviation factor;

executing a second anomaly algorithm on the plurality of aggregate records, the second anomaly algorithm having a second associated weight, wherein executing the second anomaly algorithm comprises:

computing a second traffic deviation factor; and computing a second individual probability of attack based on the second traffic deviation factor;

computing a net probability of attack as a sum of a first product and a second product, wherein the first product includes the first individual probability of attack multiplied by the first associated weight;

wherein the second product includes the second individual probability of attack multiplied by the second associated weight;

determining whether the net probability of attack is above a net probability threshold; and in response to the net probability of attack being above the net probability threshold:

identifying a candidate node, from the one or more nodes within the network, as being an attack victim, the candidate node identified based on the candidate node having a particular aggregate record exhibiting the anomaly;

identifying a set of source addresses (SAs) associated with a set of client nodes sending traffic to the candidate node within the network; and for each SA:

determining whether the SA is a legitimate or spoofed SA; and applying a local mitigation action to a subset of flows, of the plurality of packet flows, that are associated with the SA, based on whether the SA is a legitimate or spoofed SA.

2. The method of claim 1, wherein the candidate node is identified by a Destination Address (DA).

3. The method of claim 1, wherein the first associated weight is based on a first false positive rate of the first anomaly algorithm and the second associated weight is based on a second false positive rate of the second anomaly algorithm.

4. The method of claim 1, wherein computing the first traffic deviation factor further includes:

defining a first traffic deviation threshold and a second traffic deviation threshold; and determining a first attack probability threshold and a second attack probability threshold.

5. The method of claim 4, wherein computing the second traffic deviation factor further includes:

defining a third traffic deviation threshold and a fourth traffic deviation threshold; and determining a third attack probability threshold and a fourth attack probability threshold.

6. The method of claim 4, wherein computing the first individual probability further includes linearly extrapolating the first individual probability of attack based on the first traffic deviation threshold, the second traffic deviation threshold, the first attack probability threshold, and the second attack probability threshold.

7. The method of claim 1, wherein each of the plurality of aggregate records is exported to an external entity for further analysis.

8. The method of claim 1, wherein the attributes comprise any of a source address, a source port, a destination address, a destination port, a protocol, an ingress physical interface, or an egress physical interface.

9. The method of claim 1, wherein the attributes comprise informational content of fields from a packet header of each packet flow, the informational content including any of a source address, a source port, a destination address, a destination port, or a protocol.

10. The method of claim 1, wherein the state information comprises any of forwarding action, packet filtering action, byte count, packet count, drop count, source address, source port, destination address, destination port, protocol, timestamp-creation, or Quality of Service (QoS) data.

11. The method of claim 1, wherein the spoofed SA is an attacker SA, and wherein applying the local mitigation action comprises:

applying the local mitigation action to a particular subset of the plurality of packet flows traveling from the attacker SA.

12. The method of claim 1, wherein the SA is a legitimate SA, and wherein applying the local mitigation action comprises:

determining whether the legitimate SA is an attacker SA; and applying the local mitigation action to a particular subset of the plurality of flows traveling from the attacker SA.

13. A system for detecting and mitigating a Distributed Denial of Service (DDoS) attack, comprising:

a hardware processor;

a packet processing module coupled to the processor and configured to cause the system to:

generate a plurality of packet flows traveling through the system, each packet flow being generated as a first packet of the packet flow travels through the flow-state system, each packet flow having a sequence of packets that have matching attributes with each other;

generate a plurality of flow-state records for the plurality of packet flows based on attributes associated with the plurality of packet flows, each flow-state record storing a set of attributes and a set of state information associated with a corresponding packet flow, each flow-state record being updated with state information of each packet of the corresponding packet flow, as each packet travels through the system;

generate a plurality of aggregate records from the plurality of flow-state records, each aggregate record being generated by aggregating a subset of the plurality of flow-state records into the aggregate record, the aggregating based on a subset of the attributes used to generate the plurality of flow-state records;

monitor the plurality of aggregate records to detect a traffic anomaly relating to network server usage; and a Bulk Statistics Record module coupled to the processor and configured to cause the system to:

employ two or more algorithms to detect the traffic anomaly in the plurality of aggregate records wherein an individual probability of attack is calculated from each of the two or more algorithms such that there are two or more individual probabilities of attack;

compute a net probability of attack as a function of the two or more individual probabilities of attack; and wherein when the net probability of attack is greater than a net probability threshold, mitigate the traffic anomaly by applying a mitigation action based on whether the anomaly is from a legitimate address or a spoofed address.

14. The system of claim 13, wherein the operation to compute further includes to multiply each of the two or more individual probabilities of attack by a weight, wherein a sum of weights is equal to one.

15. The system of claim 13, wherein the Bulk Statistics Record module further operates to determine a list of source addresses associated with a set of network attackers causing the traffic anomaly.

16. The system of claim 13, wherein the mitigation action is configurable by an operator.

17. The system of claim 13 wherein the Bulk Statistics Record module further operates to export the plurality of aggregate records for further analysis.

* * * * *